United States Patent
Sanger et al.

(10) Patent No.: US 6,190,623 B1
(45) Date of Patent: Feb. 20, 2001

(54) APPARATUS FOR PROVIDING A PURE HYDROGEN STREAM FOR USE WITH FUEL CELLS

(75) Inventors: Robert J. Sanger, Chicago; Gavin P. Towler, Barrington; Kishore J. Doshi, Lake Zurich; Kurt M. Vanden Bussche, Lake in the Hills; John J. Senetar, Naperville, all of IL (US)

(73) Assignee: UOP LLC, Des Plaines, IL (US)

( * ) Notice: Under 35 U.S.C. 154(b), the term of this patent shall be extended for 0 days.

(21) Appl. No.: 09/336,106

(22) Filed: Jun. 18, 1999

(51) Int. Cl.$^7$ ........................................................ B01J 8/04
(52) U.S. Cl. ............................. 422/192; 48/62 R; 48/76; 48/117; 48/127.9; 422/193; 422/198; 431/7; 431/268
(58) Field of Search ................................. 48/127.9, 198.3, 48/198.7, 198.2, 199 R, 199 FM, 117, 62 R, 76; 422/188, 192–3, 198; 431/7, 170, 268; 122/4 D

(56) References Cited

U.S. PATENT DOCUMENTS

| | | | |
|---|---|---|---|
| Re. 35,696 | * 12/1997 | Mikus | 166/303 |
| 2,191,510 | * 2/1940 | Whitehurst | 585/535 |
| 2,572,338 | * 10/1951 | Hartwig et al. | 422/198 |
| 4,355,003 | * 10/1982 | Grobel | 422/206 |
| 4,451,578 | * 5/1984 | Setzer et al. | 502/303 |
| 4,479,925 | 10/1984 | Shires et al. | 423/359 |
| 4,504,447 | * 3/1985 | Spurrier et al. | 422/204 |
| 4,522,894 | 6/1985 | Hwang et al. | 429/17 |
| 4,691,071 | 9/1987 | Bricker | 585/319 |
| 4,692,306 | * 9/1987 | Minet et al. | 422/49 |
| 4,716,023 | 12/1987 | Christner et al. | 422/149 |
| 4,861,348 | 8/1989 | Koyama et al. | 48/94 |
| 4,863,712 | 9/1989 | Twigg et al. | 423/651 |
| 4,869,894 | 9/1989 | Wang et al. | 423/650 |
| 4,925,456 | 5/1990 | Egglestone | 48/127.9 |
| 4,943,493 | 7/1990 | Vartanian | 429/17 |
| 5,143,800 | 9/1992 | George et al. | 429/20 |
| 5,181,937 | 1/1993 | Karafian et al. | 48/95 |
| 5,401,589 | 3/1995 | Palmer et al. | 429/13 |
| 5,486,428 | 1/1996 | Gardner et al. | 429/19 |

(List continued on next page.)

FOREIGN PATENT DOCUMENTS

| | | |
|---|---|---|
| WO 97/45887 | 12/1997 | (WO) . |
| WO 98/08771 | 3/1998 | (WO) . |
| WO 98/13294 | 4/1998 | (WO) . |
| WO 98/46347 | 10/1998 | (WO) . |

OTHER PUBLICATIONS

Article "Will Developing Countries Spur Fuel Cell Surge?" by R. Singh, Chemical Engineering Progress, Mar. 1999, pp. 59–66.

Article "New Hydrocarbon Proton Exchange embranes Based on Sulfonated Styrene–Ethylene/Butylene–Styrene Triblock Copolymers" by G.E. Wnek et al., Electrochemical Society Proceedings (1995), vol. 95–23, pp. 247–251.

Primary Examiner—Hien Tran
Assistant Examiner—Basia Ridley
(74) Attorney, Agent, or Firm—John G. Tomei; Richard P. Silverman

(57) ABSTRACT

An apparatus is provided which comprises two burner zones using a single igniter separated by a heat transfer zone for use in low-cost hydrogen generation units. When used in conjunction with a control system which limits the effluent temperature to less than about 700° C., the apparatus can be constructed of materials such as carbon steel and stainless steel rather than more exotic materials. This simplified structure and the use of less exotic materials provides an efficient, low-cost combined partial oxidation reactor for small-scale hydrogen production systems, especially for hydrogen production systems associated with fuel cell operation for the production of electricity.

10 Claims, 3 Drawing Sheets

U.S. PATENT DOCUMENTS

| | | | |
|---|---|---|---|
| 5,595,833 | 1/1997 | Gardner et al. | 429/19 |
| 5,609,834 | 3/1997 | Hamada et al. | 422/196 |
| 5,641,585 | 6/1997 | Lessing et al. | 429/26 |
| 5,648,182 | 7/1997 | Hara et al. | 429/20 |
| 5,733,347 | 3/1998 | Lesieur | 48/61 |
| 5,741,474 | 4/1998 | Isomura et al. | 423/648.1 |
| 5,858,314 | 1/1999 | Hsu et al. | 422/211 |
| 5,861,441 | 1/1999 | Waycuilis | 518/703 |

* cited by examiner

APPARATUS FOR PROVIDING A PURE HYDROGEN STREAM FOR USE WITH FUEL CELLS

FIELD OF THE INVENTION

The present invention relates to a hydrogen generating apparatus and, more particularly, to a hybrid reforming reactor which is suitable for use as a hydrogen generation system or as an electric power generation system when used in conjunction with a fuel cell.

BACKGROUND OF THE INVENTION

The use of fuel cells to generate electrical power for electricity or to drive a transportation vehicle relies upon the generation of hydrogen. Because hydrogen is difficult to store and distribute, and because hydrogen has a low volumetric energy density compared to fuels such as gasoline, hydrogen for use in fuel cells will have to be produced at a point near the fuel cell, rather than be produced in a centralized refining facility and distributed like gasoline. To be effective, hydrogen generation for fuel cells must be smaller, simpler, and less costly than hydrogen plants for the generation of industrial gasses. Furthermore, hydrogen generators for use with fuel cells will have to be integrated with the operation of the fuel cell and be sufficiently flexible enough to efficiently provide a varying amount of hydrogen as demand for electric power from the fuel cell varies.

Hydrogen is widely produced for chemical and industrial purposes by converting materials such as hydrocarbons and methanol in a reforming process to produce a synthesis gas. Such production usually takes place in large facilities which are rarely turned down in production for even a few days per year. In addition, the operation of the industrial hydrogen production facilities are often integrated with associated facilities to improve the use of energy for the overall complex. Synthesis gas is the name generally given to a gaseous mixture principally comprising carbon monoxide and hydrogen, but also possibly containing carbon dioxide and minor amounts of methane and nitrogen. It is used, or is potentially useful, as feedstock in a variety of large-scale chemical processes, for example: the production of methanol, the production of gasoline boiling range hydrocarbons by the Fischer-Tropsch process and the production of ammonia.

Processes for the production of synthesis gas are well known and generally comprise steam reforming, autothermal reforming, non-catalytic partial oxidation of light hydrocarbons or non-catalytic partial oxidation of any hydrocarbons. Of these methods, steam reforming is generally used to produce synthesis gas for conversion into ammonia or methanol. In such a process, molecules of hydrocarbons are broken down to produce a hydrogen-rich gas stream. A paper titled "Will Developing Countries Spur Fuel Cell Surge?" by Rajinder Singh, which appeared in the March 1999 issue of *Chemical Engineering Progress*, page 59–66, presents a discussion of the developments of the fuel cell and methods for producing hydrogen for use with fuel cells. The article particularly points out that the partial oxidation process is a fast process permitting small reactors, fast startup, and rapid response to changes in the load, while steam reforming is a slow process requiring a large reactor and long response times, but operates at a high thermal efficiency. The article highlights one hybrid process which combines partial oxidation and steam reforming in a single reaction zone as disclosed in U.S. Pat. No. 4,522,894.

Modifications of the simple steam reforming processes have been proposed to improve the operation of the steam reforming process. In particular, there have been suggestions for improving the energy efficiency of such processes in which the heat available from the products of a secondary reforming step is utilized for other purposes within the synthesis gas production process. For example, processes are described in U.S. Pat. No. 4,479,925 in which heat from the products of a secondary reformer is used to provide heat to a primary reformer.

The reforming reaction is expressed by the following formula:

$$CH_4 + 2H_2O \rightarrow 4\ H_2 + CO_2$$

where the reaction in the reformer and the reaction in the shift converter are respectively expressed by the following simplified formulae (1) and (2):

$$CH_4 + H_2O \rightarrow CO + 3\ H_2 \tag{1}$$

$$CO + H_2O \rightarrow H_2 + CO_2 \tag{2}$$

In the water gas shift converter which typically follows a reforming step, formula (2) is representative of the major reaction.

U.S. Pat. No. 4,925,456 discloses a process and an apparatus for the production of synthesis gas which employs a plurality of double pipe heat exchangers for primary reforming in a combined primary and secondary reforming process. The primary reforming zone comprises at least one double-pipe heat exchanger-reactor and the primary reforming catalyst is positioned either in the central core or in the annulus thereof. The invention is further characterized in that the secondary reformer effluent is passed through which ever of the central core or the annulus is not containing the primary reforming catalyst countercurrently to the hydrocarbon-containing gas stream.

U.S. Pat. No. 5,181,937 discloses a system for steam reforming of hydrocarbons into a hydrogen rich gas which comprises a convective reformer device. The convective reformer device comprises an outer shell enclosure for conveying a heating fluid uniformly to and from a core assembly within the outer shell. The core assembly consists of a multiplicity of tubular conduits containing a solid catalyst for contacting a feed mixture open to the path of the feed mixture flow such that the path of the feed mixture flow is separated from the heating fluid flow in the outer shell. In the process, an autothermal reformer fully reforms the partially reformed (primary reformer) effluent from the core assembly and supplies heat to the core assembly by passing the fully reformed effluent through the outer shell of the convective reforming device.

U.S. Pat. No. 5,595,833 discloses a process and apparatus for operating a solid oxide fuel cell stack and includes an adiabatic pre-reformer to convert about 5 to 20% of the hydrocarbon fuel into methane, hydrogen, and oxides of carbon At startup the pre-reformer is used to perform partial oxidation with methanol to heat the solid oxide fuel stack to a temperature of about 1000° C. When the temperature of the region of the pre-reformer reaches about 500° C. the methanol flow is terminated.

WO 97/45887 discloses a hydrodesulfurizer assembly which is thermally coupled with process gas heat exchangers and a shift converter. The hydrodesulfurizer assembly is employed to cool the reformer effluent prior to passing the cooled reformer effluent to the shift converter zone.

WO 98/13294 discloses a process for removing carbon monoxide from a gas stream by subjecting the gas stream to a first stage high temperature selective catalytic methanation to lower the carbon monoxide concentration, followed by a second stage low temperature selective catalytic methanation to further lower the residual carbon monoxide concentration in the gas stream to a carbon monoxide concentration below 40 ppm.

U.S. Pat. No. 4,943,493 discloses a fuel cell power plant which integrates the operation of a reformer to convert a hydrocarbon fuel into a hydrogen-rich fuel which is passed to the anode side of a fuel cell. A portion of the anode exhaust stream is withdrawn from the fuel cell and passed to a burner zone wherein the anode exhaust gas stream is mixed with an oxidant stream and combusted to provide heat to the reformer. U.S. Pat. No. 4,943,493 discloses the problem of monitoring and controlling the flame temperature in the burner zone and claims an indirect approach to maintaining the flame temperature with a range which results in complete combustion of the fuel and avoids a very high flame temperature which may exceed the temperature resistance of the burner liner materials. The reference discloses the control of the composition of the burner gas by bypassing a portion of the anode waste gas to maintain an adiabatic flame temperature between about 1150° C. (210020 F.) and about 1480° C. (2700° F.) whereby the heat transfer to the reforming zone occurs in the radiant region to provide a high efficiency steam reforming operation.

U.S. Pat. No. 4,861,348 discloses a fuel reforming apparatus wherein the heat for the reforming zone is provided by a combustor. Flames formed within the combustion zone generate a high temperature combustion gas. The apparatus includes a heat-insulating layer for preventing radiation heat losses from the combustion gas, and a combustion gas passage disposed around the reforming zone to permit combustion gas to flow therethrough. A hydrocarbon/steam mixture is preheated by flowing on the outside of the combustion gas passage in a supply passage before the mixture is passed to the reforming zone. Heat insulation is provided as an outer layer disposed around the outer peripheral surface of the supply passage to prevent the loss of radiation from the inner wall. In one embodiment, reforming catalyst is disposed on the outside of the combustion gas passage in the supply passage to extend the reforming zone.

U.S. Pat. No. 4,863,712 discloses a steam reforming process wherein a hydrocarbon feedstock, such as methane, natural gas, LPG, or naphtha is reacted with steam and/or carbon dioxide in the presence of a supported catalyst such as nickel or cobalt. The heat required for the endothermic reaction is supplied from the sensible heat of the reactants or from an external heat source. The reformer outlet is maintained in the range of 700–900° C. or higher.

U.S. Pat. No. 4,869,894 discloses a process for the production and recovery of high purity hydrogen. The process comprises reacting a methane-rich gas mixture in a primary reforming zone at a low steam-to-methane molar ratio of up to about 2.5 to produce a primary reformate, followed by reacting the primary reformate in a secondary reforming zone with oxygen to produce a secondary reformate, comprising hydrogen and oxides of carbon. The secondary reformate is subjected to a high temperature water gas shift reaction to reduce the amount of carbon monoxide in the hydrogen-rich product. The hydrogen-rich product is cooled and processed in a vacuum swing adsorption zone to remove carbon dioxide and to produce a high purity hydrogen stream.

WO 98/08771 discloses an apparatus and method for converting feed streams such as a hydrocarbon fuel or an alcohol into hydrogen and carbon dioxide. The process comprises passing the feed stream first to a partial oxidation reaction zone to produce a partial oxidation effluent. The partial oxidation effluent is passed to a separate steam reforming reaction zone. The partial oxidation reaction zone and the steam reforming reaction zone are disposed in a first vessel. A helical tube is extended about the first vessel and a second vessel is annularly disposed about the first vessel such that the helical tube is disposed between the first and second vessels. The third vessel annularly disposed around the second vessel. Oxygen is preheated in the helical tube by heat from the partial oxidation reaction prior to being passed to the partial oxidation zone. The reformate from the steam reforming reaction zone is passed between the first and second vessel and is subjected to a high temperature shift reaction to reduce the carbon monoxide content of the reformate stream. The thus treated reformate stream is desulfurized, cooled, and subjected to a low temperature shift reaction.

U.S. Pat. No. 5,741,474 discloses a process for producing high purity hydrogen by reforming a hydrocarbon and/or oxygen atom containing hydrocarbon to form a reformed gas containing hydrogen, and passing the reformed gas through a hydrogen-separating membrane to selectively recover hydrogen. The process comprises the steps of heating a reforming chamber, feeding the hydrocarbon along with air and/or steam to the chamber and therein causing both steam reforming and partial oxidation to take place to produce a reformed gas. The reformed gas is passed through a separating membrane to recover a high purity hydrogen stream and the non-permeate stream is combusted to provide heat to the reforming chamber.

U.S. Pat. No. 5,858,314 discloses a natural gas reformer comprising a stack of catalyst plates supporting reforming catalyst and a plurality of thermally conducting plates alternately stacked to form a reforming structure, wherein the conductive plates transfer heat energy in-plane, across the surface of the conductive plate to support the reforming process.

Conventional steam reforming plants are able to achieve high efficiency through process integration; that is, by recovering heat from process streams which require cooling. In the conventional large-scale plant this occurs in large heat exchangers with high thermal efficiency and complex control schemes. In the present invention for the production of hydrogen for fuel cells it is desired to reach a high degree of process integration, with minimal equipment in order to reduce the size of the plants and the complexity of the control scheme. U.S. Pat. No. 5,861,441 discloses a process that is representative of such an integrated processing scheme for large plants with integrated compression and heat exchange. It is the objective of this invention to provide a compact apparatus for generating hydrogen from available fuels such as natural gas, hydrocarbons, and alcohols for use in a fuel cell to generate electric power. One of the problems faced by developers of hydrogen generators working with fuel cells for domestic and transportation use is the high cost of exotic material of construction which are required to withstand the high reaction temperatures of the partial oxidation and reforming processes. It is an objective of the present invention to provide a hydrogen generator for converting natural gas to hydrogen which can be operated without exceeding a process temperature of 700° C. in the heat exchange equipment and thus can be constructed of conventional materials.

Fuel cells are chemical power sources in which electrical power is generated in a chemical reaction. The most common fuel cell is based on the chemical reaction between a reducing agent such as hydrogen and an oxidizing agent such as oxygen. The consumption of these agents is proportional to the power load. Polymers with high protonic conductivities are useful as proton exchange membranes (PEM's) in fuel cells. Among the earliest PEM's were sulfonated, crosslinked polystyrenes. More recently sulfonated fluorocarbon polymers have been considered. Such PEM's are described in an article entitled, "New Hydrocarbon Proton Exchange Membranes Based on Sulfonated Styrene-Ethylene/Butylene-Styrene Triblock Copolymers", by G. E. Wnek, J. N. Rider, J. M. Serpico, A. Einset, S. G. Ehrenberg, and L. Raboin presented in the Electrochemical Society Proceedings (1995), Volume 95–23, pages 247 to 251.

It is an objective of the present invention to solve some of the problems associated with small-scale systems for producing hydrogen for a fuel cells, to provide simplified methods for producing hydrogen for a fuel cell, to provide simple and efficient methods for controlling the hydrogen generation system associated with a fuel cell, and to provide an apparatus for the generation of hydrogen that permits the reduction in scale of hydrogen generation facilities without a corresponding loss of efficiency. It is an objective of the present invention to provide a process for using the anode waste gas as the primary fuel for the generation of hydrogen for a fuel cell wherein the fluctuations in the anode waste gas flow rate and heating value are managed in the process to maintain a high overall energy efficiency.

It is an objective of this invention to provide an integrated fuel cell and hydrogen production system which is energy and hydrogen efficient. More particularly, it is an objective of the present invention to provide a process which starts up rapidly while operating at an efficiency level approaching that of a steam reformer operation.

It is an objective of the present invention to provide a process and apparatus for the generation of hydrogen for use in a fuel cell which offers a high degree of feed flexibility and which eliminates the use of a separate external fuel.

It is an objective of the present invention to provide a process and apparatus which avoids thermal cycling of the heat transfer equipment in a hydrogen generator for a fuel cell for the generation of electricity. Thermal cycling in heat exchange and reactor equipment can have a deleterious effect on such equipment and result in premature equipment failure. In the operation of fuel cells the demand for electricity is generally not constant resulting in the turn-down of the hydrogen generation equipment. Typically the turn-down ratios are very large in proportion to the daily fluctuation of demand for electric power. In addition, such systems often experience variation in the supply and quality of feeds and fuels consumed in the process which can impart a thermal cycling of the heat exchange equipment. Such thermal cycling can damage welds which could compromise the safety of the operation of the hydrogen generation equipment.

SUMMARY OF THE INVENTION

The compact hydrogen generation process and apparatus of the present invention solves a number of problems of operating such hydrogenation production systems in conjunction with fuel cells for the generation of electric power. Integrated hydrogen generation and fuel cell systems to generate electricity require meeting an electrical demand which is generally transient. Meeting these transient demands results in transient operation of the hydrogen generator which requires rapid startup and sharp turndown of the generation of hydrogen, because hydrogen cannot be stored. During the rapid startup or turndown, the heat exchange equipment can undergo thermal cycling. The present invention significantly eliminates thermal cycling while avoiding the use of complex control schemes and exotic metallurgy to provide a hydrogen generation system integrated with a fuel cell. Furthermore, the fuel processor of the present invention is applicable to a wide variety of fuel cell types including proton exchange membrane, solid oxide, and others. The present invention can achieve overall energy efficiencies up to about 85% which are comparable to steam reforming without the slow startup problems generally associated with steam reforming hydrogen generators. The apparatus of the present invention can be used in combination with hydrogen purification equipment such as pressure swing adsorption, temperature swing adsorption, absorption, cryogenic distillation, chemisorption, or membranes to provide high purity hydrogen for small commercial applications.

In one embodiment, the present invention is an combined partial oxidation burner reactor apparatus. The apparatus comprises a vertically aligned reactor shell having a top head and a bottom head, and side-wall which define an interior reactor zone. The interior reactor zone has an upper shell zone, a center shell zone, and a lower shell zone. A hollow center sleeve is sealingly disposed on the top head and extends downwardly into the lower shell zone. The center sleeve has a hollow interior which defines an upper core zone, a center core zone, and a lower core zone. An intermediate partition which has a downwardly converging diameter along its length is sealingly disposed on the wall in the center shell zone encircling a portion of said hollow center sleeve. The lower core zone is in fluid communication with a portion of the center shell zone located within the partition. A burner zone is defined within the interior reactor zone outside of the partition. A feed inlet nozzle is disposed on said top head in fluid communication with the upper core zone. A product outlet nozzle is disposed on the reactor shell in fluid communication with the upper shell zone. A burner feed nozzle is disposed on the reactor shell in fluid communication with the burner zone. An exhaust nozzle is disposed on the reactor shell in fluid communication with the burner zone. An igniter extends through the top head and downwardly into the center core zone. A first oxidation catalyst is disposed in the center core zone and a reforming catalyst is disposed above the bottom of the partition in the center shell zone and in the lower core zone.

DETAILED DESCRIPTION OF THE INVENTION

Figure 1:
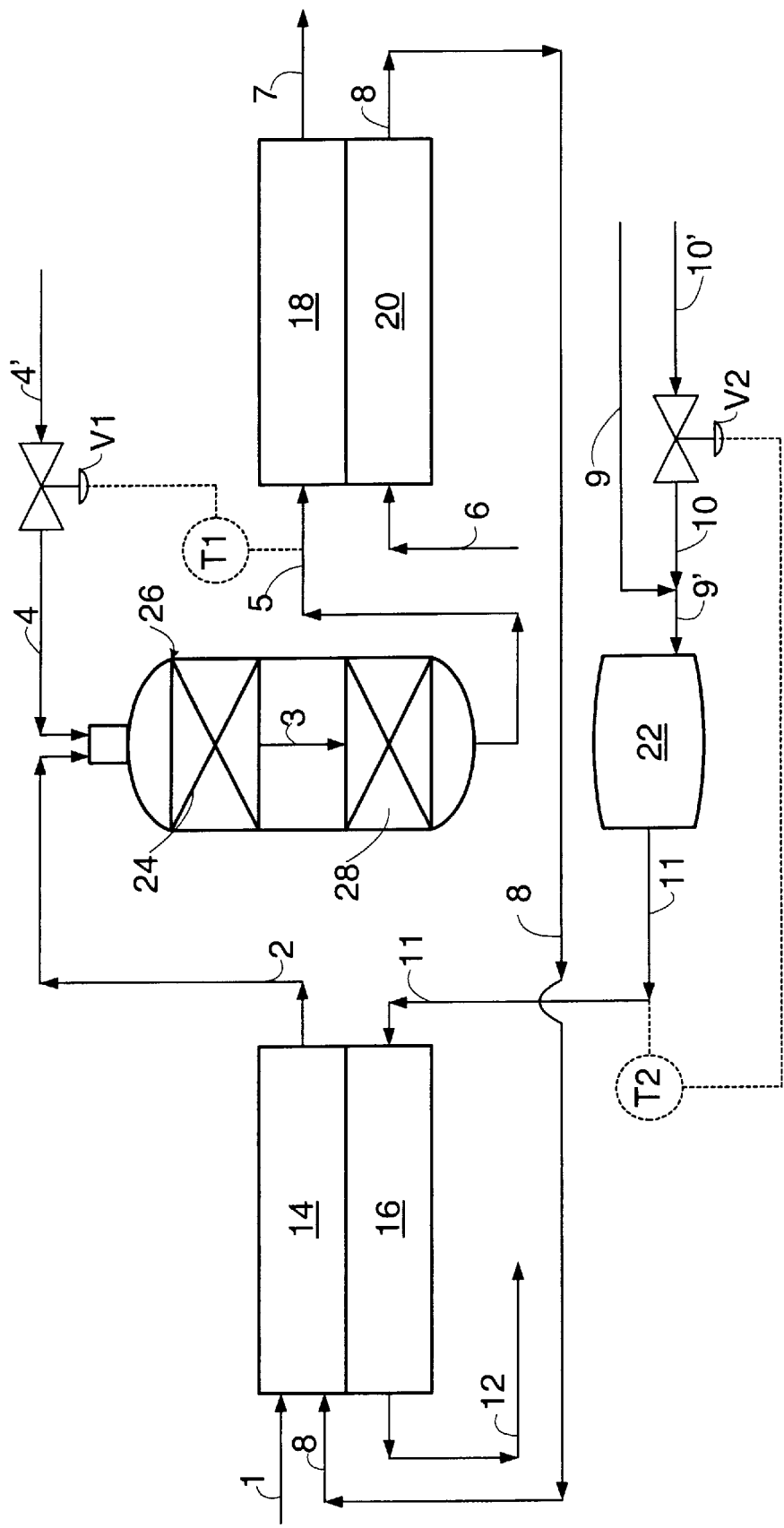
FIG. 1 is a schematic block flow diagram illustrating the core process of the performed by the apparatus.

The process and apparatus of the current invention uses a hydrocarbon stream such as natural gas, liquefied petroleum gas (LPG), butanes, gasoline, oxygenates, biogas, or naphtha (a gasoline boiling range material) as a feedstock. Natural gas and similar hydrocarbon streams generally contain impurities such as sulfur in the form of hydrogen sulfide, mercaptans, and sulfur oxides which must be removed prior to introducing the feedstock to the steam reforming zone. The removal of sulfur from the hydrocarbon feedstock may be accomplished by any conventional means including adsorption, chemisorption, and catalytic desulfurization. Generally, the type of pre-processing module for the hydrocarbon feedstock before it is charged to the fuel processor will depend on the character or type of hydrocarbon feedstock. A natural gas stream will generally contain small amounts of sulfur as hydrogen sulfide. Hydrogen sulfide in natural gas can be removed by contacting the natural gas stream with a chemisorbent such as zinc oxide in a fixed bed desulfurization zone. LPG, which comprises propane, butane, or mixtures thereof, generally contains very little sulfur and can be processed directly by the fuel processor, although the use of a guard bed of containing an adsorbent or a chemisorbent to protect the catalyst in the fuel processor may be included and some pressure moderating device such as a valve is required to deliver the LPG to the fuel processor. The pre-processing module, or pre-processor for a naphtha stream requires multi-stage treatment. Naphtha may have impurities such as sulfur as mercaptan sulfur, chemically combined sulfur (such as sulfides and disulfides), elemental sulfur, and hydrogen sulfide. In order to remove these sulfur impurities from the naphtha stream a combination of hydrodesulfurization in the presence of hydrogen over a desulfurization catalyst containing cobalt and molybdenum on a metal oxide base to convert the sulfur species to hydrogen sulfide, and a second stage to remove the hydrogen sulfide are required. Although any conventional hydrocarbon desulfurization catalyst may be used in the hydrodesulfurization zone, catalysts containing cobalt and molybdenum are preferred. In order to reduce the overall size of the hydrogen generation equipment, chemisorption with a material such as zinc oxide is preferred for removal of hydrogen sulfide. The chemisorption or hydrodesulfurization based desulfurization operations will generally take place at effective desulfurization conditions including a desulfurization pressure of between about 100 to about 1000 kPa. Preferably the desulfurization operation is carried out at a desulfurization pressure of between 200 and 300 kPa. Preferably the desulfurization operation is carried out at a desulfurization temperature less than about 300° C., and more preferably the desulfurization operation is carried out at a desulfurization temperature between about 50° C. and about 300° C. Preferably the concentration of sulfur in the desulfurized feedstock will be less than about 10 ppm-wt, and more preferably the concentration of sulfur in the desulfurized feedstock will be less than about 1 ppm-wt.

Water is required by the steam reforming process for use as a reactant and as a cooling medium. In addition for some types of fuel cells, the hydrogen product must be delivered to the fuel cell as a wet gas. This is particularly true with PEM fuel cells, wherein the humidity of the hydrogen product stream is controlled to avoid drying out the PEM membrane in the fuel cell. The water used in the steam reforming process preferably is deionized to remove dissolved metals and anions. Metals which could be harmful to catalysts include sodium, calcium, lead, copper, and arsenic. Anions such as chloride ions should be reduced or removed from water. Removal of these cations and anions are required to prevent pre-mature deactivation of the steam reforming catalyst or other catalytic materials contained in the fuel cell such as the water gas shift catalyst or the carbon monoxide oxidation catalyst in a carbon monoxide reduction zone. The deionization of the water to be used in the process may be accomplished by any conventional means.

One of the problems addressed by the present invention is the supply of heat to a steam reforming reaction which will convert hydrocarbon, or alcohol to hydrogen and oxides of carbon in the presence of water or steam over a reforming catalyst. Alcohols and other oxygen-containing hydrocarbons are easier to reform and generally can be reformed at relatively low reforming temperatures. However, hydrocarbons require a higher heat input. Prior to the process of the present invention, attempts were made to transfer heat in the radiant and the convection range of heat transfer. Unfortunately, this requires the use of high temperature radiant heat transfer zones and correspondingly exotic metallurgy to provide sufficient heat to the reforming reaction at an acceptable heating rate. In the present scheme, the feedstock is first pre-reformed at a moderate pre-reforming temperature of less than about 700° C., and the pre-reformed effluent is subjected to a partial oxidation step. The heat generated in the exothermic partial oxidation step can provide the heat to the endothermic reforming step if the two steps occur in close proximity to each other, and independent of other heat integration within the integrated process of hydrogen generation and fuel cell operation. In this manner the partial oxidation zone can provide heat at high temperatures (i.e., greater than about 700° C.). By the use of the pre-reforming zone and the partial oxidation zone, it is believed that the reforming temperature can now be lowered from the high temperature to a moderate temperature range (below about 700° C.) where exotic metallurgy is not required, or to a range wherein a portion of the reforming reaction heat may be supplied by other heat sources within the overall process. Thus, by this rearrangement, the reforming step becomes independent of high temperature process heat integration and can be operated either in the radiant or in the convection range in close proximity to the partial oxidation reaction. The reforming reaction can also take place without the use of exotic metallurgy. For example, the heat required by the pre-reforming step can be supplied by indirect heat exchange within the overall process. Heat required for the pre-reforming step can be provided by heat from the exothermic water gas shift reaction step, or heat for the reforming process can be provided by the heat of combustion of waste gases from the fuel cell, or a combination thereof. Preferably, the heat for the pre-reforming step is supplied by indirect heat exchange with flue gases from the combustion of anode waste gas from the fuel cell anode electrode.

The pre-processed feedstock is admixed with a steam stream to form a pre-reforming admixture and the pre-reforming admixture is passed to a pre-reforming zone for the partial conversion of the pre-treated feedstock to a pre-reformed stream comprising hydrogen, carbon monoxide, carbon dioxide, and unconverted hydrocarbons. The steam can be supplied by the indirect heating of water with process heat from heat recovered in the water gas shift reaction or from heat recovered from flue gas resulting from the combustion of anode waste gas. Preferably the steam is supplied by heating water with the heat recovered from the water gas shift reaction zone. Preferably, the steam to carbon ratio of the pre-reforming admixture is between about 1:1 and about 6:1, and more preferably, the steam to carbon ratio of the pre-reforming admixture is between about 1:1 and about 3:1, and most preferably, the steam to carbon ratio of the pre-reforming admixture comprises about 2:1. The pre-reforming zone contains a pre-reforming catalyst comprising a catalyst base such as alumina with a metal deposited thereon. Preferably, the pre-reforming catalyst includes nickel with amounts of noble metal, such as cobalt, platinum, palladium, rhodium, ruthenium, iridium, and a support such as magnesia, magnesium aluminate, alumina, silica, zirconia, singly or in combination. More preferably, the steam reforming catalyst can be a single metal such as nickel or a noble metal supported on a refractory carrier such as magnesia, magnesium aluminate, alumina, silica, or zirconia, singly or in combination, promoted by an alkali metal such as potassium. The pre-reforming catalyst can be granular and is supported within the steam reforming zone. The pre-reforming catalyst may be disposed in a fixed bed or disposed on tubes or plates within the pre-reforming zone. In the process of the present invention, the pre-reforming zone is operated at effective pre-reforming conditions including a pre-reforming temperature of between about 300 and about 700° C. and a pre-reforming pressure of between about 100 and about 350 kPa. More preferably, the pre-reforming temperature ranges between about 350° C. and about 600° C., and most preferably the pre-reforming temperature comprises a temperature between about 350° C. and about 550° C. The pre-reforming reaction is an endothermic reaction and requires heat be provided to initiate and maintain the reaction.

In the present invention, the pre-reforming zone is in intimate thermal contact with a first heat exchange zone which transfers heat by indirect heat exchange to the pre-reforming zone. The first heat exchange zone is heated by the passage of a burner exhaust stream or flue gas stream from a burner zone. It is an important aspect of the invention that the burner exit temperature of the burner exhaust stream not exceed about 700° C. so that the heat transfer to the pre-reforming zone occur by convection rather than by radiation. In this way, although there will be some loss of overall thermal efficiency, the first heat exchange zone can be constructed of a material such as stainless steel or carbon steel and thereby avoid the use of exotic, high cost metallurgy in the pre-reformer zone. In order to maintain the burner exit temperature below 700° C., the amount, or the rate, of the air stream passed to the burner zone is controlled. In this way the burner exit temperature sets the maximum hot side temperature for the first heat transfer zone and maintains the hot side temperature of the first heat exchange zone at a relatively constant level following the startup of the hydrogen generation section and thereby avoids setting up a thermal cycle in the first heat exchanger and maintaining an essentially steady-state temperature profile within the first heat exchanger. As used herein the term steady-state means that the temperature profile is characterized by a lack of temperature transients. Also, by maintaining the burner exit temperature below the radiant heat transfer region, the use of expensive, sophisticated oxygen sensors and related controls and radiation shielding can be avoided.

The pre-reformed stream is passed at effective partial oxidation conditions to a partial oxidation zone wherein the pre-reformed stream is contacted with an oxygen-containing stream, or first air stream, in the presence of a partial oxidation catalyst to produce a partial oxidation product. If the pre-reformed stream is not at effective partial oxidation conditions, such as during the startup of the fuel processor when there is insufficient fuel for the burner zone to heat the pre-reforming zone, the pre-reformed stream and the oxygen-containing stream are ignited to begin the partial oxidation reaction in the partial oxidation zone. The partial oxidation product comprises hydrogen, carbon monoxide, carbon dioxide and some unconverted hydrocarbons. The partial oxidation catalyst is disposed in the partial oxidation zone as a fixed bed. Catalyst compositions suitable for use in the catalytic partial oxidation of hydrocarbons are known in the art (See U.S. Pat. No. 4,691,071, which is hereby incorporated by reference). Preferred catalysts for use in the process of the present invention comprise as the catalytically active component, a metal selected from Group VIII noble metal, a Group IVA metal and a Group IA or IIA metal of the Periodic Table of the Elements composited on a metal oxide support, wherein the support comprises a cerium-containing alumina. The alumina can be alpha-alumina, or a mixture of alpha-alumina and theta-alumina. Preferably the cerium is present in the amount of about 0.01 to about 5.0% by weight of the support. Preferably, the Group VIII noble metal in the partial oxidation catalyst is a noble metal selected from the group consisting of platinum, palladium, and rhodium. Preferably, the Group IVA metal which is present on the partial oxidation catalyst is selected from the group consisting of germanium, lead, and tin and the Group IVA metal is present in an amount of from about 0.01% to about 5% by weight of the partial oxidation catalyst. Preferably, the Group IA or Group IIA metal is present in the partial oxidation catalyst is selected from the group consisting of sodium, potassium, lithium, rubidium, cesium, beryllium, magnesium, calcium, francium, radium, strontium, and barium and the Group IA or Group IIA metal is present in an amount in the range of from about 0.01% to about 10% by weight of the partial oxidation catalyst. The catalytically active metal may also be supported on suitable carrier materials well known in the art, including the refractory oxides, such as silica, alumina, titania, zirconia and mixtures thereof. Preferably, the partial oxidation catalyst is granular and is supported as a fixed catalyst bed within the partial oxidation zone. In the process of the present invention, the partial oxidation zone is operated at effective partial oxidation conditions including a partial oxidation temperature of below about 1400° C. and a low partial oxidation pressure of between about 100 and about 350 kPa. More preferably, the partial oxidation temperature ranges between about 500° C. and about 1400° C., and most preferably the partial oxidation temperature is between about 600° C. and about 1100° C.

In the apparatus of the present invention, the partial oxidation reaction zone is positioned in close proximity to a steam reforming zone so that the heat contained in the products of the exothermic partial oxidation reaction rather than being recovered is employed directly to deliver the partial oxidation effluent stream to the steam reforming zone at effective steam reforming conditions and to partially maintain the steam reforming reaction zone at effective steam reforming conditions. In addition, the combined partial oxidation/steam reforming reaction zone links the exothermic partial oxidation zone with the endothermic steam reforming reaction zone to provide thermal compensation for the high temperatures generated in the partial oxidation zone. The steam reforming zone provides internal cooling of the walls of the combined reactor zone thus permitting the use of carbon steel and stainless steel metallurgy rather than exotic metallurgy in a combined partial oxidation zone/steam reforming zone. After starting up the combined partial oxidation/steam reforming reactor arrangement, there is a need to switch from a partial oxidation mode towards a steam reforming mode of operation by reducing the air rate to the partial oxidation zone and by providing heat to the steam reforming zone. In the one embodiment of the present invention, additional heat is supplied by the indirect heat exchange with the above mentioned burner exhaust stream, or flue gas stream, so that during the operation of the combined partial oxidation/steam reforming reactor zone, the proportion of the conversion taking place in the partial oxidation zone is shifted in favor of the steam reforming zone. Preferably the flue gas temperature ranges from about 400 to about 800° C. This shift occurs as the increasing anode waste gas supply and improving heating value permit the operation of the burner zone to provide heat to the steam reforming zone and the pre-reforming zone. The heating value or heating quality of the anode waste gas improves as the concentration of hydrogen in the anode waste gas increases. In this manner the overall efficiency of the fuel processor can advance from the 77 percent energy efficiency of the partial oxidation reaction toward the 87 percent energy efficiency of the steam reforming reaction. In this manner, the combined reactor system of the present invention approaches the higher efficiency of the steam reforming operation, without the slow thermal and conversion response of the steam reforming zone. By overall efficiency it is meant the percent efficiency as determined from the net heating value of the hydrogen in the product hydrogen gas divided by the net heating value of the feedstock. Once the system has reached operating temperatures, that is the burner exit temperature and the steam reforming temperatures approach 700° C., these operating temperatures are maintained to retain the essentially steady-state temperature profile in the first and the second heat exchanger zones and the variations in demand for electrical power are met by switching between the partial oxidation and the steam reforming reactions and by adjusting the flow of the hydrocarbon feedstock to the pre-processing, or preparation, module.

The use of partial oxidation provides improved start-up performance although it reduces the overall efficiency of the operation. Steam reforming on the other hand is slow to start up and operates at a much higher overall efficiency. The combination of the partial oxidation, the reforming, and the pre-reforming zones as provided by the present invention are especially useful in controlling and tolerating the fluctuations in the fuel rate as the demand for electrical power varies. Furthermore, the scheme employs a low complexity control system which is able to handle the variations in fuel flow rate and in fuel quality simultaneously.

The partial oxidation product is passed to the steam reforming zone containing a steam reforming catalyst to produce a reforming effluent stream. Preferably, the steam reforming catalyst includes nickel with amounts of noble metal, such as cobalt, platinum, palladium, rhodium, ruthenium, iridium, and a support such as magnesia, magnesium aluminate, alumina, silica, zirconia, singly or in combination. More preferably, the steam reforming catalyst can be a single metal such as nickel or a noble metal supported on a refractory carrier such as magnesia, magnesium aluminate, alumina, silica, or zirconia, singly or in combination, promoted by an alkali metal such as potassium. Most preferably, the steam reforming catalyst comprises nickel supported on alumina and promoted by an alkali metal such as potassium. The steam reforming catalyst can be granular and is supported as a fixed catalyst bed within the steam reforming zone. In the process of the present invention, the steam reforming zone is operated at effective reforming conditions including a reforming temperature of below about 700° C. and a reforming pressure of between about 100 and about 350 kPa. More preferably, the reforming temperature ranges between about 350° C. and about 700° C., and most preferably the reforming temperature is between about 550° C. and about 650° C. The reforming effluent stream is withdrawn from the reforming zone at a reforming exit temperature of below about 700° C. The reforming exit temperature is maintained at a value of about 700° C. by controlling the rate of the supply of the oxygen-containing stream to the partial oxidation zone. In this manner, the reforming exit temperature establishes the hot side temperature for a second heat exchange zone which will be employed to remove heat from a water gas shift reaction zone.

The reforming effluent is passed to at least one water gas shift reaction zone which exothermically reacts the carbon monoxide over a shift catalyst in the presence of an excess amount of water to produce additional amounts of carbon dioxide and hydrogen. The following is a description of a two-zone water gas shift reaction zone, although any number of water gas shift reaction zones may be employed to reduce the carbon monoxide level in the $H_2$ product. The steam reforming effluent is combined with water and cooled to an effective high temperature shift temperature of between about 400° C. to about 450° C. to provide a cooled steam reforming effluent. The cooled steam reforming effluent is passed over a high temperature shift catalyst to produce a high temperature shift effluent. The high temperature shift catalyst is selected from the group consisting of iron oxide, chromic oxide, and mixtures thereof. The high temperature shift effluent is cooled to reduce the temperature of the high temperature shift effluent to a temperature of between about 180° C. and about 220° C. to effective conditions for a low temperature shift reaction and to provide a cooled high temperature shift effluent. The cooled high temperature shift effluent is passed to a low temperature shift zone and contacted with a low temperature shift catalyst to further reduce the carbon monoxide and produce a low temperature shift effluent. The low temperature shift catalyst comprises cupric oxide (CuO) and zinc oxide (ZnO). Other types of low temperature shift catalysts include copper supported on other transition metal oxides such as zirconia, zinc supported on transition metal oxides or refractory supports such as silica or alumina, supported platinum, supported rhenium, supported palladium, supported rhodium, and supported gold. The low temperature shift reaction is a highly exothermic reaction and a portion of the heat of the low temperature shift reaction is removed by indirect heat exchange in a second heat exchange zone with a water stream to produce a steam stream. The steam stream is admixed with the treated hydrocarbon feedstock to further conserve thermal energy and provide steam to the pre-reforming zone. The water gas shift effluent stream or hydrogen product comprises less than about 0.5 mol-% carbon monoxide.

Because carbon monoxide acts as a poison to some fuel cells like the PEM fuel cell, the carbon monoxide concentration in the hydrogen product must be removed, or its concentration reduced for example by oxidation, conversion, or separation, before the hydrogen product can be used in these fuel cells to produce electricity. Options for post-processing of the hydrogen product stream to further reduce the carbon monoxide content include selective catalytic oxidation and methanation. In addition, some fuel cells operate at different levels of hydrogen consumption per pass, or hydrogen efficiencies. For example, some fuel cell arrangements demand high purity hydrogen and consume more than about 80% of the hydrogen per pass, while others consume less than about 70% of the hydrogen per pass and do not require high purity hydrogen. In a case which requires high purity, the hydrogen product stream is passed to a separation zone comprising a thermal swing adsorption system or a pressure swing adsorption system to produce a high purity hydrogen stream (95 to 99.999 mol-% hydrogen) and a separation waste stream comprising carbon oxides. A portion of the high purity hydrogen stream may be used in the hydrodesulfurization zone and the remaining portion of the high purity hydrogen stream is passed to the fuel cell zone. Anode waste gas, along with the separation waste steam is passed to the burner zone. For non-fuel cell applications, the use of the anode waste gas can be substituted with a fuel gas stream such as a waste gas stream from a hydrogen purification system like a pressure swing adsorption process.

For fuel cells such as PEM fuel cells which are sensitive to carbon monoxide, the hydrogen product is passed to a carbon oxide oxidation zone at effective oxidation conditions and contacted with a selective oxidation catalyst to produce a carbon oxide reduced hydrogen product gas stream comprising less than about 40 ppm-mole carbon monoxide. Preferably, the carbon oxide reduced hydrogen product gas stream comprises less than about 10 ppm-mole carbon monoxide, and more preferably, the carbon oxide reduced hydrogen product gas stream comprises less than about 1 ppm-mole carbon monoxide. The heat of oxidation produced in the carbon monoxide oxidation zone is removed in a conventional manner by cooling the carbon monoxide oxidation zone in a convention means such as with a water jacket and a cooling water stream.

For a PEM fuel cell, the carbon oxide reduced hydrogen product gas comprising water at saturation and at a temperature less than about 100° C. is passed to the anode side of a fuel cell zone comprising at least one proton exchange membrane (PEM). The PEM membrane has an anode side and a cathode side, and is equipped with electrical conductors which remove electrical energy produced by the fuel cell when an oxygen containing stream is contacted with the cathode side of the PEM membrane. It is required that the PEM membrane be kept from drying out by maintaining the carbon oxide reduced hydrogen product stream at saturation conditions. It is also critical that the PEM membrane be maintained at a temperature less than 100° C. When the PEM membrane is operated to be only about 70 percent efficient in its use of the hydrogen product stream, the fuel cell produces an anode waste gas comprising hydrogen and a cathode waste gas comprising oxygen. Typically, anode waste gas comprises hydrogen, nitrogen, and carbon dioxide. The anode waste gas produced by the present invention comprises less than about 50 mol-% hydrogen, and the cathode waste gas comprises less than about 15 mol-% oxygen.

A second oxygen-containing gas such as air and the anode waste gas withdrawn from the fuel cell anode side are contacted in the burner zone mentioned hereinabove at effective combustion conditions to maintain a burner exit temperature less than about 700° C. In this manner, the hydrogen generated by the partial oxidation or steam reforming reaction zones and not consumed by the fuel cell is burned to provide thermal integration of the overall process, and in the same burning step any nitrogen introduced by the use of the partial oxidation zone is thereby rejected.

In the configuration provided by the apparatus of the present invention, at a steady state operation there is no provision to add heat to the reforming step, and the degree of partial oxidation remains essentially constant. The scheme is much more efficient than a fully autothermal process because the heat from the burner zone is used to provide heat to the steam reforming reaction which raises the overall efficiency of the process. The use of the burner zone in intimate thermal contact with the reforming zone as employed in this scheme allows significantly more heat recovery in the pre-reforming operation than if heat were only recovered from the reaction products. Other schemes in the prior art only use heat recovery from the reaction products, such schemes are most often practiced in large-scale plants. The large-scale plants do not have an anode waste gas stream to employ as fuel. In addition, the process of the present invention permits the use of less exotic metals which significantly reduces the capital cost of the key process equipment.

In the present invention when applied to fuel cell systems, only the anode waste gas is used as fuel, no methane is added and therefore no complex fuel balancing is required to manage fluctuations in fuel quality and anode waste gas production. Anode waste gas composition will vary both in amount and in heat capacity as the efficiency and demand for electricity in the fuel cell change. The air flow to the burner zone is controlled to compensate for the variations in the anode waste gas composition and thereby achieve a constant burner exit temperature of the flue gas withdrawn from the burner. Thus, as the amount of heat available from the anode waste gas is reduced, reducing the heat available to the pre-reformer, there is a corresponding increase in the air demand or rate delivered to the partial oxidation zone to provide additional heat to the system. In the partial oxidation zone a control scheme is provided to control the outlet temperature of the reformer by varying the amount of the second air stream that is introduced to the partial oxidation zone. In this way, the steam reforming outlet, or effluent temperature is maintained essentially at a constant value. If the amount of anode waste gas decreases, the process begins to operate as an autothermal reforming process and the efficiency approaches about 77 percent. If the anode waste gas heat content or amount increases the amount of partial oxidation is reduced. When the degree of partial oxidation is reduced, the overall process approaches a steam reforming operation which has efficiency range between 85 and 87 percent.

Thermal variations in the apparatus and in the overall system are minimized to achieve a steady operation by the use of two independent burner control systems. By controlling the exit temperatures of the burner zone and the reforming zone in this manner, variations in the fuel rate are compensated for automatically to provide an essentially steady-state temperature profile in the external first and second heat exchange zones which eliminates thermal cycling within the individual heat exchange zones. In addition, the heat available to the pre-reforming zone, the partial oxidation, and the reforming zone always achieve the same overall hydrocarbon conversion. Controlling the temperature at the outlet of the reforming zone to a temperature of about 700° C. of permits the use of less exotic metallurgy in the construction of the apparatus for the partial oxidation and reforming zones and the coupling of the partial oxidation and steam reforming zones to any separate or additional heat exchange zone is not required.

One of the problems in developing hydrogen generation in small-scale reforming systems is the elimination of thermal cycling of the vessels. Such cycling can result in thermal stresses which lead to fatigue fractures at the welds. Variations in turndown rate, fuel rate, and fuel quality in prior art systems often resulted in a thermal cycling throughout the system. The control system disclosed herein maintains the hot side temperature profile in each of the major heat exchange zones at an essentially constant value after startup and thereby avoids any significant variation which would produce thermal cycling in the heat exchange zones. The cold side temperatures in the present system are set by the feed temperature. Thus, thermal cycling and the resulting damage from thermal stresses to heat exchanger zones are effectively limited and an essentially uniform thermal profile is maintained within the heat exchanger zones. A feature of the process redistributes the heat transfer and reaction zones to employ heat exchange between streams with relatively low thermal, or enthalpy, contents relative to the amount of heat generated or consumed in the reaction zones. Variations in flow rates are controlled before these flow variations can impact the equipment and create temperature swings in the reaction zones. Thereby, temperature fluctuations in the heat exchanger zones are avoided. Furthermore, the present technique of the controlling hot side temperatures in a range which permits the use of less exotic metallurgy while responding to fluctuations in electrical demand yields significant capital cost advantages with a minimal loss of overall energy efficiency.

DETAILED DESCRIPTION OF THE DRAWINGS

Referring to FIG. 1, a hydrocarbon feedstock in line 1 for use in a fuel cell system for the generation electric power is passed to a pre-reforming zone 14. A steam stream in line 8 is also passed to the pre-reforming zone 14. The pre-reforming zone contains a pre-reforming catalyst selected from the group consisting of nickel on alumina, and the like. The pre-reforming zone 14 is in intimate thermal contact with a first heat exchange zone 16 which supplies heat by indirect heat exchange in the convection temperature range to heat the pre-reforming zone 14. A pre-reforming effluent stream is withdrawn from the pre-reforming zone 14 in line 2. The pre-reforming effluent stream is passed to a partial oxidation zone 24 at effective partial oxidation conditions including a partial oxidation temperature and a partial oxidation pressure. The partial oxidation temperature ranges between about 550 and about 900° C. The partial oxidation pressure ranges between about 100 to about 350 kPa (15 to about 50 psia). Either simultaneously with the introduction of the pre-reforming effluent or as a partial oxidation feed admixture combined with the pre-reforming effluent stream, a first air stream in line 4 is introduced to the partial oxidation zone 24. The partial oxidation zone 24 contains a partial oxidation catalyst. In the partial oxidation zone, at least a portion of the pre-reforming effluent stream is converted to produce a partial oxidation effluent stream comprising hydrogen, carbon monoxide, carbon dioxide, and water. The partial oxidation effluent stream shown as line 3 is withdrawn from the partial oxidation zone 24 and passed to a reforming zone 28. The reforming zone 28 contains a reforming catalyst. In the reforming zone 28, the partial oxidation effluent stream undergoes a further conversion to produce a reforming effluent stream comprising hydrogen, carbon monoxide, carbon dioxide, and water. The partial oxidation zone 24 and the main reforming zone 28 are combined into a single combined reaction zone 26. The heat for the pre-reforming zone 14 is supplied by indirect heat transfer between flue gas from the burner zone 22. The heat from the reforming effluent stream withdrawn from the reforming zone 28 is used to provide a steam stream in line 8 for the pre-reforming zone 14. The reforming effluent stream is withdrawn from the reforming zone 28 in line 5 and passed to a water gas shift reaction zone 18. The water gas shift reaction zone 18 contains at least one water gas shift catalyst zone and provides for the conversion of carbon monoxide to additional amounts of hydrogen to produce a hydrogen product stream. The hydrogen product stream is withdrawn from the water gas shift reaction zone 18 in line 7. The water gas shift reaction is a highly exothermic reversible reaction and must be cooled to maintain the selectivity toward the conversion of carbon monoxide and water to carbon dioxide and hydrogen. The water gas shift reaction zone 18 of the present invention is cooled by indirect heat exchange with a second heat exchange zone 20 which is in intimate thermal contact with the water gas shift reaction zone 18. The water gas shift reaction zone 18 is used herein as a boiler and steam generation zone wherein a water stream in line 6 is passed through the second heat exchange zone to produce the steam stream in line 8. All or a portion of the steam stream in line 8 produced in this manner is returned to be admixed with the hydrocarbon feedstock in line 1. In the apparatus of the present invention, the burner zone 22 is in intimate thermal contact with the reforming zone 28 of a combined reaction zone 26 (See FIG. 1).

The hydrogen product stream in line 7 which generally comprises less than about 50 ppm carbon monoxide is passed to a fuel cell zone (not shown). If the fuel cell zone is sensitive to carbon monoxide, the concentration of carbon monoxide may be further reduced in a conventional manner by selective oxidation techniques or methanation techniques well-known to those skilled in the art. For example, reduction of the carbon dioxide concentration to a level of less than 100 ppm-mol is required for PEM-type fuel cells, while carbonate based fuel cell technology does not have a carbon monoxide limitation. In the fuel cell zone, the hydrogen product steam or a carbon monoxide reduced hydrogen stream is passed to an anode side of a fuel cell, while an oxygen containing stream such as air is passed to a cathode side of the fuel cell and an anode waste stream which is now depleted in hydrogen relative to the hydrogen product stream is withdrawn from the fuel cell. The anode waste gas in line 9 and a second air stream in line 10, which is introduced via line 10' and valve V2 are admixed in line 9' and passed to a burner zone 22 to combust the anode waste gas and produce a flue gas stream in line 11. The burner zone may contain a combustion catalyst to assure the complete combustion of the anode waste gas in the burner zone. The flue gas stream is passed to the first heat exchange zone 16 in line 11 to provide heat to the pre-reforming zone 14 and a cooled flue gas stream is withdrawn from the first heat exchange zone in line 12.

In the operation of the process and apparatus for the generation of hydrogen, the system is controlled in a relatively simple manner which overcomes many of the problems associated with fluctuations in demand for power and starting up the system. The control system for the process comprises a temperature measuring device "T1" to measure the temperature of the outlet of the reforming zone 28, shown as measuring the exit temperature of the reforming effluent in line 5, and adjusting the rate or flow of the first air stream in line 4' by opening or closing valve V1. Initially at startup, the introduction of the first air stream at effective partial oxidation conditions adds heat to the system by initiating the exothermic partial oxidation reaction. The effective partial oxidation conditions are achieved at startup by heating the hydrocarbon/first air stream admixture with a heating means such as an electrical heater. Microwave heating may also be employed to initiate the partial oxidation reaction. The exit temperature of the reforming effluent in line 5 is controlled by adjusting the rate of the first air stream. Increasing the rate of the first air stream increases the exit temperature and decreasing the air rate decreases the exit temperature of the reforming effluent in line 5. As the reformer produces the reforming effluent, the reforming effluent is passed through the shift reaction zone 18 and the fuel cell zone (not shown) and the anode waste gas in line 9 is mixed with the second air stream in line 10 and returned to the burner zone to be combusted to produce the flue gas stream in line 11. The flue gas temperature in line 11 is measured by controller "T2" and the flow rate of the second air stream is adjusted to maintain the flue gas temperature below about 700° C. When the flue gas temperature is above the desired value, the rate of the second air stream is increased, and when the flue gas temperature is below the desired value the rate of the second air stream is reduced. In this manner the hot side temperatures of the heat exchange zones 16 and 20 are maintained at relatively constant values and thermal cycling of the heat exchange surfaces is minimized.

Figure 2:
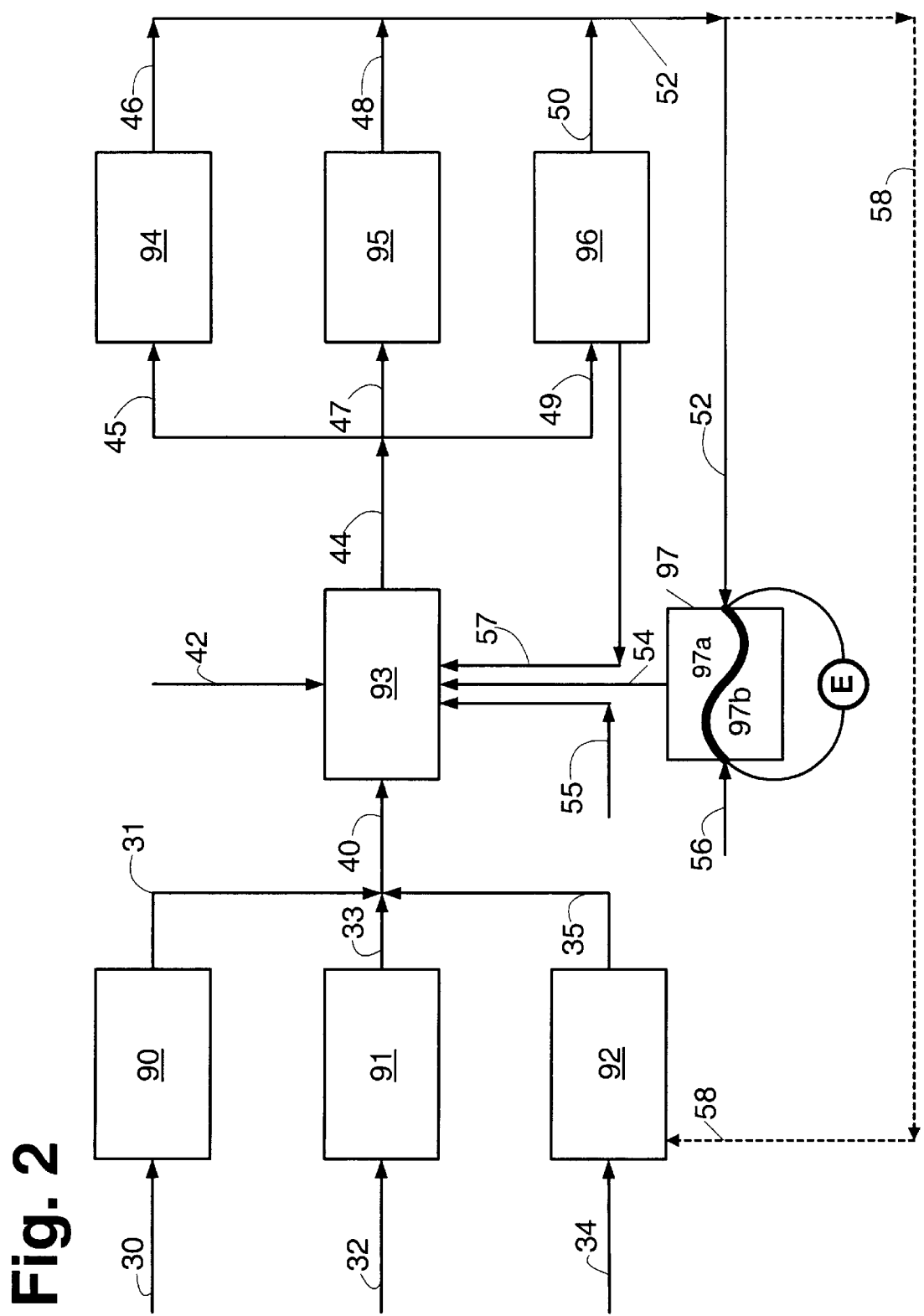
FIG. 2 is a schematic block flow diagram illustrating pre and post processing options that may be used in conjunction with the apparatus of this invention.

FIG. 2 represents a system to be used in conjunction with the apparatus of the present invention for conversion of a hydrocarbon feedstock such as a natural gas stream in line 30, a liquefied petroleum (LPG) gas stream in line 32, or a gasoline boiling range stream in line 34 to electric power E using a fuel cell. Referring to FIG. 2, a natural gas stream in line 30 is passed to a first pre-processing or preparation module 90 comprising a desulfurization zone. The desulfurization zone contains a sorbent for the removal impurities such as sulfur compounds including hydrogen sulfide and mercaptans. The desulfurization sorbent is selected from the group consisting of zeolites, activated carbon, activated alumina, zinc oxide, and mixtures thereof. A processed natural gas stream is removed from the first pre-processing zone in line 31 and passed via lines 31 and 40 to a fuel processor zone 93. The fuel processor zone comprises the components disclosed and described with respect to FIG. 1 for the pre-reforming, partial oxidation, reforming, and burner processing operations and the first and second heat exchange operations to provide heat to the pre-reforming zone and to remove heat from the water gas shift reaction zone, respectively. A first air stream in line 42 is passed to the partial oxidation zone of the fuel processor zone 93, a second air stream in line 55 and an anode waste gas stream in line 54 are passed to the burner zone of the fuel processor zone 93, and a hydrogen product stream is withdrawn from the fuel processor zone 93 in line 44. Depending upon the type of fuel cell system employed in the fuel cell 97, essentially 3 types of post-processing modules may be employed, if any post processing is required. The degree of post-processing will also depend upon the hydrogen purity requirements of the fuel cell 97. For example, if the fuel cell is designed to consume less than about 70 percent; that is, the consumption of hydrogen per pass is between about 50 to about 75 percent, and the fuel cell requires carbon monoxide reduction, then the hydrogen product is passed via lines 44 and 45 to a selective oxidation zone 94 to catalytically oxidize the carbon monoxide to carbon dioxide and produce a processed hydrogen stream in line 46. The processed hydrogen stream is passed via lines 46 and hydrogen header 52 to the anode side 97a of the fuel cell 97. An oxygen stream such as a third air stream in line 56 is passed to the cathode side 97b of the fuel cell 97 to produce electric power. Similarly, a methanation zone 95, can be employed to reduce the carbon monoxide concentration in the hydrogen product stream in line 44 by passing the hydrogen product stream to the methanation zone 95 via lines 44 and 47 and therein contacting the hydrogen product stream with a methanation catalyst at effective conditions well-known to those skilled in the art to produce the processed hydrogen stream in line 48, which is conveyed to the anode side 97a of fuel cell 97 via the hydrogen header 52. When the fuel cell 97 is designed to operate by converting at least about 80 mol-% of the hydrogen per pass, the hydrogen product stream is passed via lines 44 and 49 to the post-processing module 96 which can include a pressure swing or a temperature swing adsorption step to produce a high purity hydrogen stream in line 50. The high purity hydrogen stream comprises a hydrogen purity of greater than about 95 percent hydrogen. As part of the pressure swing or the temperature swing adsorption step, a waste stream is produced at low pressure in line 57 which is returned to the burner zone in the fuel processor zone 93. The advantage of using the pressure swing or the temperature swing adsorption step in post-processing module 96 is that the burner zone operation of the apparatus becomes more stable and waste gas and high purity hydrogen are available as quickly as 20 seconds following the start of operations. Catalytic operations such as those of the selective oxidation zone 94 and the methanation zone 95 require a 20 to 30 minute delay before the catalytic zone can reach effective operating conditions and any suitably treated product hydrogen stream is available. When the pressure swing or the temperature swing adsorption step is employed, a portion of the high purity hydrogen can be passed via line 50, hydrogen header 52 and line 58 to provide a hydrogen stream to catalytically desulfurize a gasoline feedstock 34 in pre-processing module 92 which comprises a catalytic desulfurization zone and a sorbent desulfurization zone. Shown in the drawing as line 58, a portion of the hydrogen product stream can be passed via lines 50, 52, and 58 to the desulfurization zone (preprocessing module 92) to desulfurize the gasoline feedstock 34 to provide a desulfurized gasoline feedstock in line 35 which can be passed to the fuel processor zone 93 via lines 35 and 40. The desulfurization zone of pre-processing module 92 is similar to the desulfurization zone of pre-processing module 90. The liquefied petroleum gas (LPG) stream in line 32 is generally essentially free of sulfur having less than about 1 ppm-wt sulfur and the pre-processing module 91 comprises a pressure valve to reduce the pressure of the LPG to the pressure of the fuel processor system to pass the reduced pressure LPG in lines 33 and 40 to the fuel processor zone 93.

Figure 3:
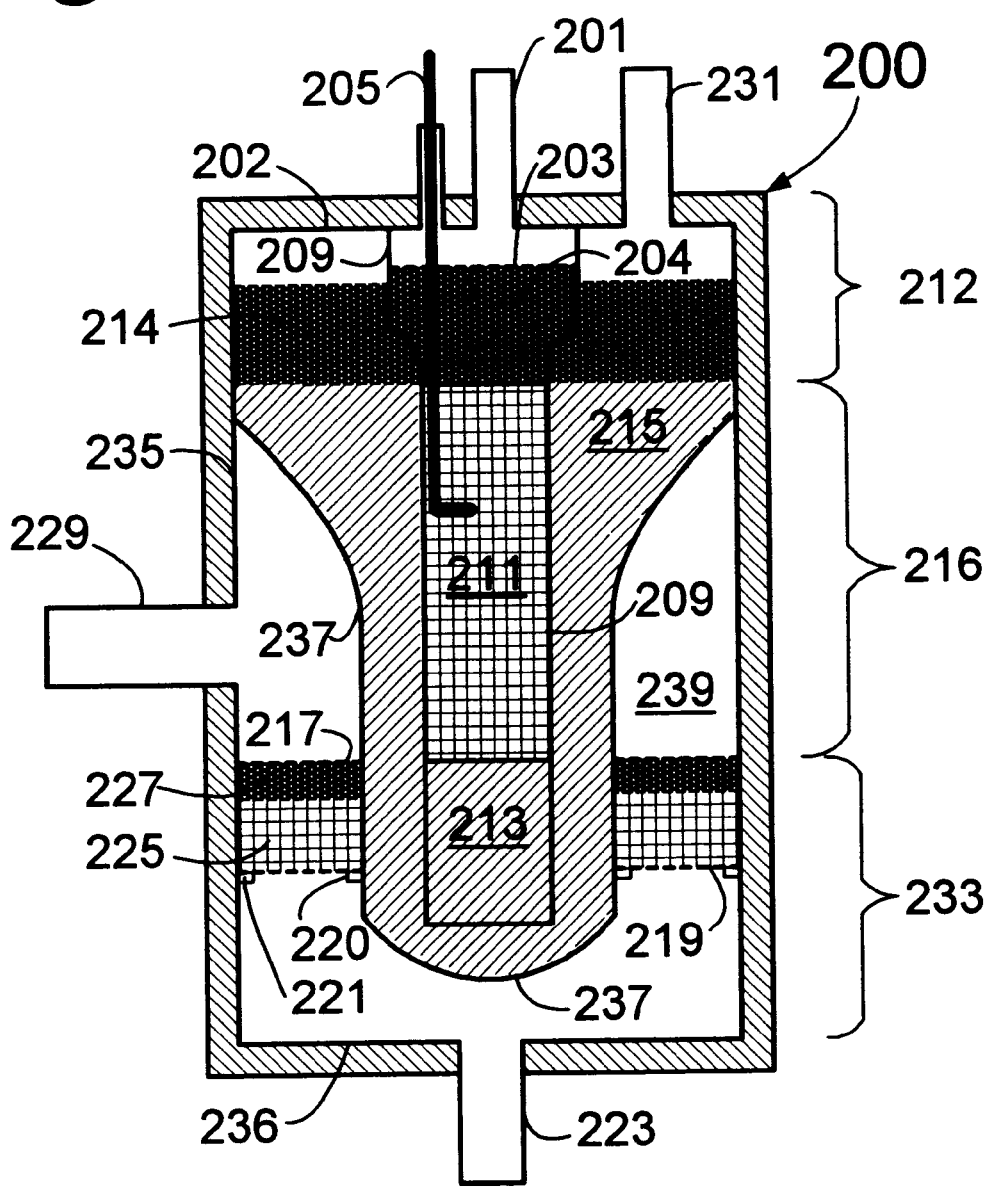
FIG. 3 is a side view of a combined reaction zone apparatus of the present invention.

As shown in FIG. 3, the combined reaction zone apparatus 200 comprises a vertically aligned reactor shell having a side-wall 235, a top head 202, and a bottom head 236. The side-wall 235 is insulated and defines an interior reactor zone. The interior reactor zone has an upper shell zone 212, a center shell zone 216, and a lower shell zone 233. A hollow center sleeve 209 is sealingly disposed on the top head 202 and extends downwardly into the lower shell zone 233. The hollow center sleeve 209 has a hollow interior which defines an upper core zone 204, a center core zone 211, and a lower core zone 213. A first oxidation catalyst is disposed with the center core zone 211 or partial oxidation reaction zone. A porous particle retainer 203 is rigidly disposed in the upper core zone 204 below the top head 202. An intermediate partition 237 is sealingly disposed on the side-wall 235 in the center shell zone 216 and has a downwardly converging diameter along its length and extends downwardly into the lower shell zone 233 encircling a portion of the hollow center sleeve 209. A burner zone 239 is defined within the interior reactor zone outside of the intermediate partition. The intermediate partition 237 may be welded or sealingly disposed to the side-wall 235. A reforming zone 215 is defined within the interior reactor zone inside the intermediate partition 237. The lower core zone 213 is in fluid communication with the reforming zone 215. A reforming catalyst is disposed above the bottom of the intermediate partition 237 in the reforming zone 215 and in the lower core zone 213. A top annular screen 217 is rigidly disposed between the side-wall 235 and the intermediate partition 237 in the burner zone 239. A bottom annular screen 219 is similarly disposed in the burner zone below the top annular screen 217. The bottom annular screen 219 is rigidly supported by an outer and an inner support ring (221, 220). The outer support ring 221 is rigidly disposed on the side-wall 235 and the inner support ring 220 is rigidly disposed on the intermediate partition 237 in the lower shell zone 233. A feed inlet nozzle 201 is disposed on the top head 202 in fluid communication with the upper shell zone 212. A product outlet nozzle 231 is disposed on the side-wall 235 or the top head 202 in fluid communication with the upper shell zone 212. A burner feed nozzle 223 is disposed on the side-wall 235 or on the bottom head 236 in fluid communication with the lower shell zone 233 in the burner zone 239. An exhaust nozzle 229 for exiting flue gas is disposed on the side-wall 235 in fluid communication with the burner zone 239. An igniter 205 extends through the top head 202 and downwardly through the porous particle retainer 203 well into the center core zone 211. Preferably, the igniter 205 extends to a point near the middle of the center core zone 211. The igniter 205 is removably disposed through the top head 202 and the porous particle retainer 203. The igniter 205 is comprised of two rods having a proximal end and a distal end. The rods comprise an alloy such as incoloy and are bridged by at least two cross bars or other bridging means for electrically bridging the rods at the distal end. The rods are positioned inside the center core zone or partial oxidation reaction zone 211 such that when sufficient electrical current is applied to the proximal ends of the igniter rods, there will be heat transferred to the partial oxidation catalyst in an amount which is effective to light-off the partial oxidation reaction.

In the combined reaction zone apparatus 200, a first oxidation catalyst is disposed in the center core zone 211. A reforming catalyst is disposed in the lower core zone 213 and in the reforming zone 215. A second oxidation catalyst is disposed in the lower shell zone 233 between the top and bottom annular screens (217, 219). Optionally, a first layer of inerts is disposed above the first oxidation catalyst in the upper core zone 204. A second layer of inerts 214 is disposed in the upper shell zone 212 above the reforming zone 215. A third layer of inerts 227 is disposed below the top annular screen 217 and above the second oxidation catalyst 225. The inert layers above the catalyst serve to support the catalysts during the assembly of the combined reaction zone apparatus 200 and to improve fluid distribution and heat transfer within the combined reaction zone apparatus 200.

The combined reaction zone apparatus 200 is shown which includes the functions of a partial oxidation zone 211, a reforming zone 215, a burner zone 239, a first internal heat transfer zone between the exhaust gases and the reforming zone and a second internal heat transfer zone between the partial oxidation zone 211 and the reforming zone 215. The partial oxidation zone 211 serves to provide heat to the reforming zone 215 and the heated reforming zone provides heat to ignite the burner zone 239. Thus, the apparatus includes two burner zones (211 and 239) wherein the first burner zone 211 provides heat to light the second burner zone 239 without the need for an igniter in the second burner zone. The first burner zone comprises the partial oxidation zone containing a first oxidation catalyst and the second burner zone comprises the burner zone. A second oxidation catalyst 225 is preferably disposed in the burner zone 239 to assist in the combustion of gases in the burner zone. In the burner zone 239, a fuel gas or a waste gas such as anode waste gas from the fuel cell zone is essentially completely combusted.

At startup, partial oxidation feed or the effluent from the pre-reforming zone is introduced into the partial oxidation reactor inlet 201 and passed into a partial oxidation reaction zone 211 formed by the interior of the center sleeve. The partial oxidation feed passes through a bed of inert material in the upper core zone 204. The inert material can include ceramic balls, silica, glass, or quartz. The partial oxidation feed contacts the partial oxidation catalyst in the center core zone 211. This bed of inert material serves to place the partial oxidation zone in the center of the combined reaction zone apparatus 200 and provides a thermal offset which permits less exotic metals such as stainless steel to be used in the construction of the combined reaction zone apparatus. A partial oxidation catalyst found to be particularly useful for oxidizing methane at a low light-off temperature is a catalyst prepared from alpha-alumina having about 1 wt-% platinum and having a reduced acid activity. The acidity of the partial oxidation catalyst is reduced by the further addition of about 0.35 wt-% lithium on the alpha-alumina.

EXAMPLES

Example I

The operation of a fuel processor of the present invention was simulated with an engineering design and simulation system for the conversion of a natural gas stream at ambient temperature into electric power using a PEM fuel cell wherein the anode waste stream withdrawn from the fuel cell is the only source of fuel to heat the pre-reforming zone. The fuel processor is designed to produce about 130 NL/mn of hydrogen to be converted into about 10 kW (net production about 7 kW) of electricity from the fuel cell using about 70% of the hydrogen per pass. Within the system, the exit temperature of the combined partial oxidation/reforming zone is maintained at about 650° C. and the temperature of the flue gas leaving the burner zone is maintained at about 650° C. by controlling the rate of the first and second air streams passed to the partial oxidation/reforming zone and the burner zone, respectively.

In the scheme for processing natural gas, the natural gas at a flow rate of about 2.07 kg/h and a pressure of about 1.3 kPa is passed to a compressor to raise the pressure to about 86 kPa and a temperature of about 80° C. to provide a compressed feed stream. The compressed feed stream is passed to a treater containing zinc oxide and operating at desulfurization temperature of about 250° C. to remove sulfur impurities and to produce a treated feed stream. The treated feed stream is passed to a pre-reforming zone which contains a pre-reforming catalyst and is heated by the flue gases from a burner zone such that the pre-reforming effluent stream is maintained at a pre-reforming effluent temperature of between about 400° and 650° C. The pre-reforming effluent comprises about 40 mol-% hydrogen, 19.2 mol-% methane, 1.2 mol-% CO, 7.6 mol-% $CO_2$, 0.6 mol-% $N_2$ and about 31.4 mol-% $H_2$. The pre-reforming effluent is passed to a combined partial oxidation zone/reforming zone and the second air stream is introduced at a second air rate to maintain the exit temperature of the reforming zone at or below 650° C. About 6.5 kg/h of air are combined with about 6.54 kg/h pre-reforming effluent to produce a reforming effluent of about 13.04 kg/h. The reforming effluent comprises about 39.1 mol-% $H_2$, 22.2 mol-% $H_2O$, 1.1 mol-% methane, 7.8 mol-% $CO_2$, 7.0 mol-% CO, and about 22.8 mol-% $N_2$. The effluent is passed to a shift converter which is cooled by indirect heat exchange with an ionized water stream to produce a steam stream and a shift effluent stream. The shift effluent stream comprises 45.66 mol-% $H_2$, 22.8 mol-% nitrogen, 14.36 mol-% $CO_2$, 15.6 mol-% $H_2O$, and about 0.5 mol-% CO.

The shift effluent stream or product hydrogen stream is passed to a preferential oxidation (prefox) zone for the further reduction of the CO content of the product hydrogen stream to less than about 50 ppm-mol CO. A prefox effluent stream is withdrawn from the prefox zone at a temperature of about 80° C. The prefox effluent or CO reduced hydrogen product stream, or "prefox" effluent is passed to the anode side of the fuel cell to produce about 10.4 kW of electric power and an anode waste gas stream. The fuel cell uses about 70% of the hydrogen and produces an anode waste gas stream. Approximately 1 to 1.6 kW of power are consumed by the compressor and an air blower second air stream is introduced at a second air rate to maintain the exit temperature of the reforming zone at or below 650° C. About 6.5 kg/h of air are combined with about 6.54 kg/h pre-reforming effluent to produce a reforming effluent of about 13.04 kg/h. The reforming effluent comprises about 39.1 mol-% $H_2$, 22.2 mol-% $H_2O$, 1.1 mol-% methane, 7.8 mol-% $CO_2$, 7.0 mol-% CO, and about 22.8 mol-% $N_2$. The effluent is passed to a shift converter which is cooled by indirect heat exchange with an ionized water stream to produce a steam stream and a shift effluent stream. The shift effluent stream comprises 45.66 mol-% $H_2$, 22.8 mol-% nitrogen, 14.36 mol-% $CO_2$, 15.6 mol-% $H_2O$, and about 0.5 mol-% CO.

Example II

The process disclosed herein permits the heat exchangers and combined reactor apparatus components of the fuel processor to operate within the temperature and pressure limitations of carbon steel and stainless steel which significantly influences the total cost of the fuel processor apparatus. The following Table presents the relative cost of the fuel processor apparatus as a function of the materials of construction. By operating the fuel processor such that the hot side of the process does not exceed 700° C., either stainless steel or carbon steel can be employed resulting in significant savings over operating in the reforming reactors and combustion zones in the radiant heat exchange region to achieve high heat exchange efficiencies and using exotic materials. The following Table presents the relative cost of the fuel processor apparatus as a function of the materials of construction relative to the cost of all carbon steel materials. The process as shown in FIG. 1 when operated to maintain the reforming exit temperature and the burner flue gas temperature below 650° C., permits the use of carbon steel or stainless steels for all of the heat exchanger and reactor apparatus components of the system. Surprisingly, this high side temperature limitation results in a significant cost advantage for the overall system. For example, according to the cost ratio for the use of incoloy, there is a 12:1 cost advantage for the carbon steel materials and a 2–3:1 advantage for use of the stainless steel materials (304 or 316) over the use of incoloy.

TABLE

RELATIVE COST OF FUEL PROCESSOR EQUIPMENT

| Material | Max. Temperature | Allowable Stress | Cost |
|---|---|---|---|
| Carbon Steel | 900° F. | 6500 psi | 1 |
| 2-¼ Cr - 1 Mo | 1200° F. | 1400 psi | 3 |
| 9 Cr - 1 Mo | 1200° F. | 1500 psi | 6.55 |
| 304 S.S. | 1500° F. | 1400 psi | 3.95 |
| 316 S.S. | 1500° F. | 1300 psi | 5.7 |
| 321 S.S. | 1500° F. | 300 psi | 6 |
| 347 S.S. | 1500° F. | 800 psi | 7.8 |
| Incoloy 800H | 1650° F. | 980 psi | 11.9 |
| HK 40[4] | 2000° F. | 800 psi | 16.3 |

We claim:

1. A combined partial oxidation burner reactor comprising:

a vertically aligned reactor shell having a top head and a bottom head, and side-wall defining an interior reactor zone, said interior reactor zone having an upper shell zone, a center shell zone, and a lower shell zone;

a hollow center sleeve sealingly disposed on the top head and extending downwardly into the lower shell zone, said center sleeve having a hollow interior defining an upper core zone, a center core zone, and a lower core zone;

an intermediate partition having a downwardly converging diameter along its length sealingly disposed on the side-wall in said center shell zone encircling a portion of said hollow center sleeve, said lower core zone being in fluid communication with a portion of the center shell zone located within said partition;

a burner zone defined within the interior reactor zone between the bottom head and said intermediate partition;

a feed inlet nozzle disposed on said top head in fluid communication with the upper core zone;

a product outlet nozzle disposed on said reactor shell in fluid communication with said upper shell zone;

a burner feed nozzle disposed on said reactor shell in fluid communication with the burner zone;

an exhaust nozzle disposed on said reactor shell in fluid communication with the burner zone; and an igniter extending through the top head and downwardly into the center core zone; wherein a first oxidation catalyst is disposed in said center core zone and a reforming catalyst is disposed on the intermediate partition in the center shell zone and in the lower core zone.

2. The combined partial oxidation burner reactor of claim 1 further comprising a first layer of inerts disposed above said first oxidation catalyst.

3. The combined partial oxidation burner reactor of claim 1 further comprising a second layer of inerts disposed on said reforming catalyst in the upper shell zone.

4. The combined partial oxidation burner reactor of claim 1 further comprising:

a top annular screen disposed in the burner zone and rigidly disposed between the side-wall and the intermediate partition in the burner zone; and a bottom annular screen disposed in the burner zone, said bottom annular screen rigidly supported by an outer and an inner support ring, said outer support ring being rigidly disposed on the side-wall and the inner support ring being rigidly disposed on said intermediate partition within the burner zone; wherein a second oxidation catalyst is disposed between the top and bottom annular screens.

5. The combined partial oxidation burner reactor of claim 3 further comprising a third layer of inerts disposed above said second oxidation catalyst.

6. The combined partial oxidation burner reactor of claim 1 wherein said side-wall, top head, bottom head, center sleeve, and intermediate partition comprise stainless steel.

7. The combined partial oxidation burner reactor of claim 1 wherein said partition is welded to the side-wall.

8. The combined partial oxidation burner reactor of claim 1 wherein said igniter comprises two rods each having a proximal end and a distal end extended into the center core zone wherein said rods are bridged by at least two cross bars at the distal end.

9. The combined partial oxidation burner reactor of claim 1 wherein said igniter is removably disposed through said top head.

10. The combined partial oxidation burner reactor of claim 1 further comprising a porous particle retainer rigidly disposed in the upper core zone within the center sleeve.

* * * * *